(12) United States Patent
He

(10) Patent No.: US 11,444,449 B2
(45) Date of Patent: *Sep. 13, 2022

(54) ELECTRICAL WIRING DEVICE

(71) Applicant: Hubbell Incorporated, Shelton, CT (US)

(72) Inventor: Zhouxiang He, Dongguan (CN)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/135,298

(22) Filed: Dec. 28, 2020

(65) Prior Publication Data
US 2021/0119434 A1    Apr. 22, 2021

Related U.S. Application Data

(63) Continuation of application No. 16/133,557, filed on Sep. 17, 2018, now Pat. No. 10,879,688, which is a (Continued)

(30) Foreign Application Priority Data

Aug. 31, 2015  (CA) ...................................... 2902573

(51) Int. Cl.
*H02H 3/00*    (2006.01)
*H02H 3/16*    (2006.01)
(Continued)

(52) U.S. Cl.
CPC ............ *H02H 3/162* (2013.01); *H01H 83/04* (2013.01); *H01H 2071/044* (2013.01); *H01H 2083/045* (2013.01)

(58) Field of Classification Search
None
See application file for complete search history.

(56) References Cited

U.S. PATENT DOCUMENTS 6,392,513 B1    5/2002   Whipple et al.
7,365,621 B2    4/2008   Germain et al.
(Continued)

*Primary Examiner* — Stephen W Jackson
(74) *Attorney, Agent, or Firm* — Michael Best & Friedrich LLP

(57) ABSTRACT

A circuit interrupting device includes an input conductor for electrically connecting to an external power supply, a load conductor for electrically connecting to a downstream load, a face conductor for electrically connecting to an external load, and a brush conductor in electrical communication with the input conductor and movable between a closed position and an open position. The brush conductor includes a second portion offset from a first portion such that a first terminal and a second terminal are positioned on separate planes. When the brush conductor is in the closed position, the first terminal contacts the load terminal and the second terminal contacts the face terminal to provide electrical communication between the input conductor, the load conductor, and the face conductor. When the brush conductor is in the open position, the first terminal is spaced apart from the load terminal and the second terminal is spaced apart from the face terminal.

18 Claims, 17 Drawing Sheets

Related U.S. Application Data continuation of application No. 14/922,871, filed on Oct. 26, 2015, now Pat. No. 10,079,484.

(60) Provisional application No. 62/199,953, filed on Jul. 31, 2015.

(51) Int. Cl.
*H01H 83/04* (2006.01)
*H01H 71/04* (2006.01)

(56) References Cited

U.S. PATENT DOCUMENTS

| | | |
|---|---|---|
| 9,099,228 B2 | 8/2015 | Padro |
| 10,079,484 B2 * | 9/2018 | He .................... H01H 83/04 |

* cited by examiner

ELECTRICAL WIRING DEVICE

CROSS-REFERENCE TO RELATED APPLICATIONS

This application is a continuation of co-pending U.S. patent application Ser. No. 16/133,557, filed Sep. 17, 2018, which is a continuation of U.S. patent application Ser. No. 14/922,871, filed Oct. 26, 2015, which claims the benefit of Canadian Application No. 2,902,573, filed Aug. 31, 2015, and also claims the benefit of U.S. Provisional Patent Application No. 62/199,953, filed Jul. 31, 2015. The entire contents of these documents are hereby incorporated by reference.

BACKGROUND

The present application relates generally to an electrical wiring device and particularly to a ground fault circuit interrupter (GFCI) device.

GFCI devices are designed to trip in response to the detection of a ground fault condition at an AC load. Generally, the ground fault condition results when a person or object comes into simultaneous contact with a side of an AC load and an earth ground, a condition that can result in serious injury. The GFCI device detects this condition by using a sensing transformer to detect an imbalance between the currents flowing in the line and neutral conductors of the AC supply, as will occur when some of the current on the line side is being diverted to ground. When such an imbalance is detected, an electrically-held relay having primary power contacts within the GFCI device is immediately de-energized to place the primary power contacts in an open condition, thereby opening both sides of the AC line and removing all power from the load. Many types of GFCI devices are capable of being tripped not only by contact between the line side of the AC load and ground, but also by a connection between the neutral side of the AC load and ground. The latter type of connection, which may result from a defective load or from improper wiring, is potentially dangerous because it can prevent a conventional GFCI device from tripping at the intended threshold level of differing current between line and neutral when a line-to-ground fault occurs.

SUMMARY

When a ground fault occurs in the protected circuit, or when the test button is depressed, the GFCI device trips and an internal circuit breaker opens both sides of the AC line. The tripping of the circuit breaker causes the reset button to pop out and may provide additional visual indications that a ground fault has occurred. In order to reset the GFCI device, the reset button is depressed in order to close and latch the circuit.

In addition, ground fault protection from mis-wiring may also be provided. Specifically, GFCI receptacles may be erroneously connected with the incoming AC source conductors being tied directly to the load or feed-through terminals of the receptacle rather than to the source terminals. Because of the nature of the internal wiring of the GFCI receptacle, this mis-wiring condition is not easily detected. AC power will still be present at the receptacle outlets, making it appear that the receptacle is operating normally. If the test push button is depressed, the latching mechanism within the GFCI receptacle will be released and the reset push button will pop out, again making it appear that the GFCI receptacle is operating normally and providing the desired ground fault protection. In reality, however, no such protection is being provided because the AC source has been wired directly to the receptacle outlets without passing through the internal circuit breaker of the GFCI device.

As a GFCI device is repeatedly tested or is frequently interrupting the power-supply circuit, its primary contacts begin to wear and, over time, the primary contacts do not have sufficient area or contact pad left to effectively withstand the severe electrical consequences of interrupting an energized circuit, in particular, arcing. When the GFCI device primary contacts are at the end of their useful life, in some cases the primary contacts may weld together. As a result, the electrical power circuit to the load will not be interrupted even though the GFCI circuit signals the occurrence of a fault. Alternatively, it is also possible that a conventional GFCI circuit would not indicate that a fault has occurred, which also create a potentially unsafe condition.

Many GFCI devices employ an integrated circuit or chip in a sensing circuit that processes data received from the sensing transformers and provides an output or trip signal that can be used to activate a gated device such as an SCR and energize a solenoid and open the contacts. A microprocessor, in turn, monitors outputs from the GFCI chip and SCR, among other components. When ground fault (GF) current levels vary or fluctuate in the vicinity of the GF current threshold, intermittent GFCI chip outputs can occur. These intermittent outputs may have sufficient energy to turn the SCR on and, at the same time, result in insufficient energy in a solenoid coil to open the contacts. Thus, it is possible for the microprocessor to make a false end-of-life determination.

In one aspect, a circuit interrupting device includes an input conductor for electrically connecting to an external power supply, a load conductor for electrically connecting to a downstream load, a face conductor for electrically connecting to an external load, and a brush conductor in electrical communication with the input conductor and movable between a closed position and an open position. The load conductor includes a load terminal, and the face conductor includes a face terminal. The brush conductor includes a first portion supporting a first terminal and a second portion supporting a second terminal. The second portion is offset from the first portion such that the first terminal and the second terminal are positioned on separate planes. When the brush conductor is in the closed position, the first terminal contacts the load terminal and the second terminal contacts the face terminal to provide electrical communication between the input conductor, the load conductor, and the face conductor. When the brush conductor is in the open position, the first terminal is spaced apart from the load terminal and the second terminal is spaced apart from the face terminal to inhibit electrical communication between the input conductor, the load conductor, and the face conductor.

In another aspect, a circuit interrupting device includes a circuit board, a line conductor for electrically connecting to an external power supply, a load conductor for electrically connecting to an external load, a face conductor for electrically connecting to another external load, a brush conductor in electrical communication with the line conductor and movable between a closed position and an open position, and a latch assembly. The load conductor includes a load terminal. The face conductor includes a face terminal. The brush conductor includes a first terminal selectively contacting the face terminal and a second terminal selectively contacting the load terminal. The latch assembly includes a housing movable along an axis and a switch member. The housing includes an arm for biasing the brush conductor toward the closed position, and an end positioned proximate the circuit board. The switch member includes a main portion coupled to the end of the housing, and a pair of flanges resiliently connected to the main portion. Each flange extends away from the main portion at an angle and includes an end configured to contact the circuit board in a predetermined area, such that simultaneous contact of each flange end with the circuit board completes a circuit.

In yet another aspect, a method for closing a circuit for an electrical wiring device, the wiring device including a face conductor including a face terminal and a load conductor including a load terminal, the method including: moving a brush conductor in a first direction by a first distance, the brush conductor including a first portion having a first terminal and a second portion having a second terminal, the second terminal contacting one of the load terminal and the face terminal; and moving the brush conductor in the first direction by a second distance, a portion of the brush conductor deflecting such that the first terminal contacts the other of the load terminal and the face terminal.

Other aspects will become apparent by consideration of the detailed description and accompanying drawings.

DETAILED DESCRIPTION

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1:
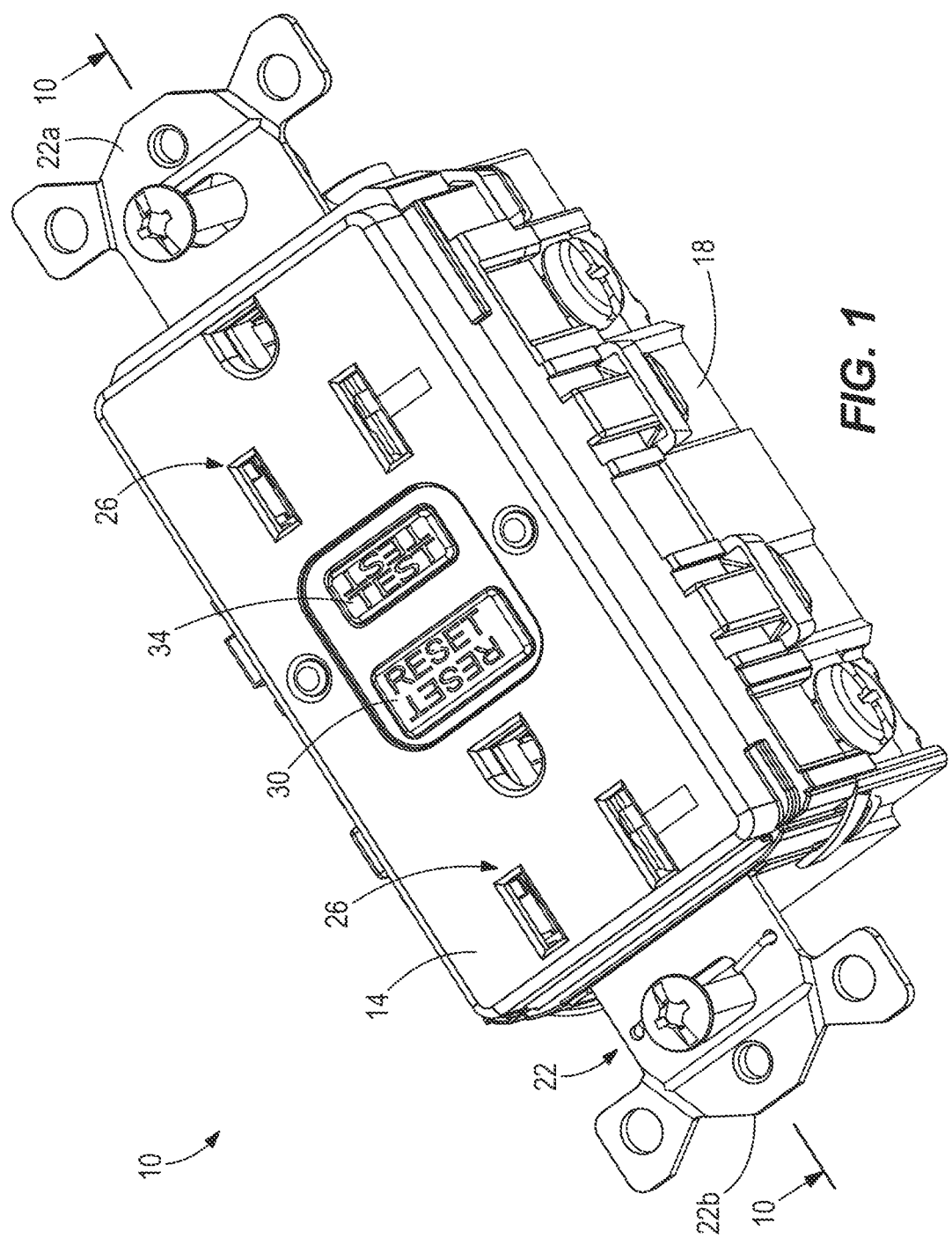
FIG. 1 is a perspective view of an electrical wiring device.

FIG. 1 illustrates an electrical wiring device 10 (e.g., an electrical outlet receptacle) including a ground fault circuit interrupter (GFCI) mechanism. The device 10 a face plate 14, a housing 18 coupled to the face plate 14, and a mounting strap or bracket 22 having a first end 22a and a second end 22b. The face plate 14 includes a pair of outlets 26, a reset button 30, and a test button 34.

Figure 2:
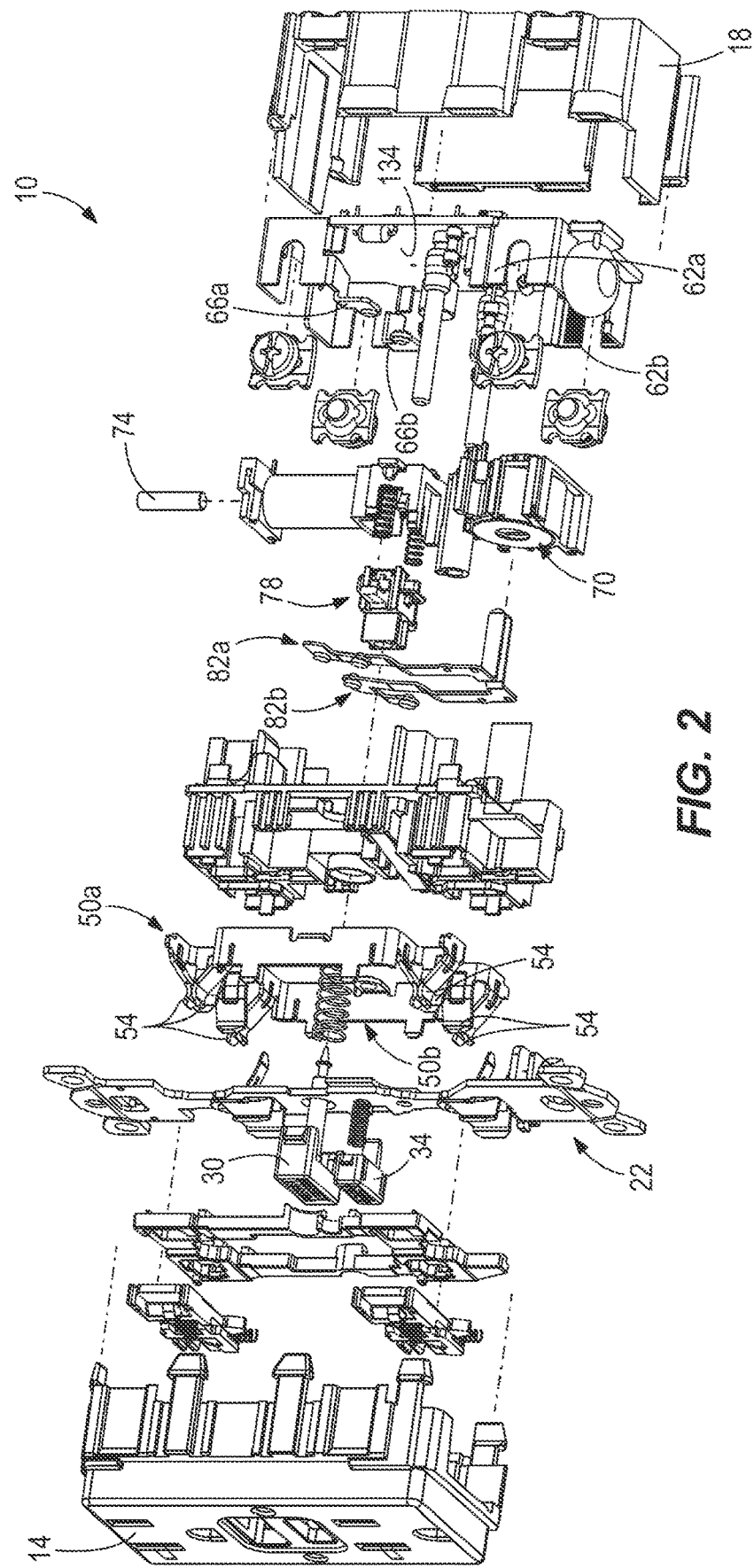
FIG. 2 is an exploded view of the electrical wiring device of FIG. 1.
Figure 3:
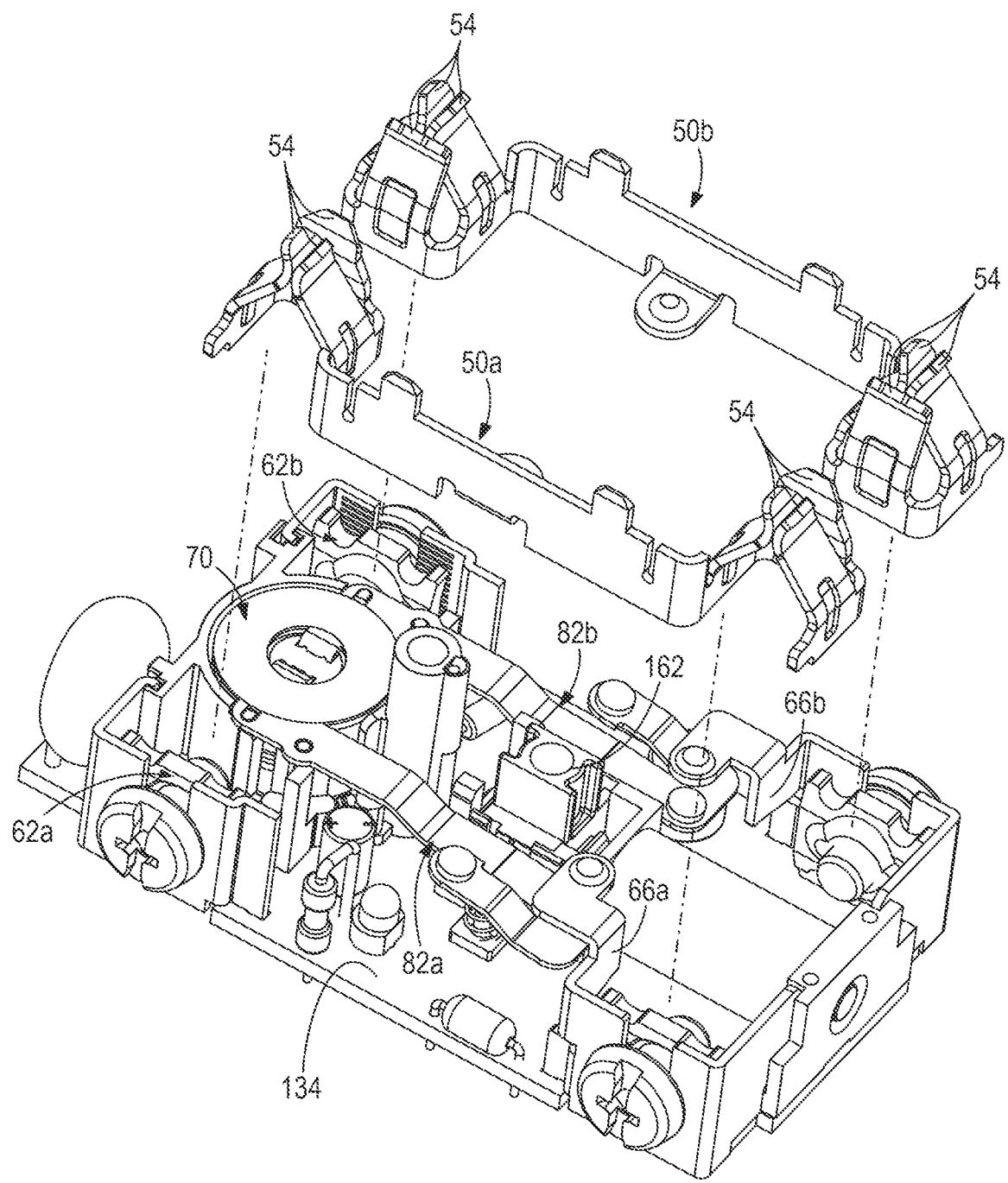
FIG. 3 is a partially exploded view of a portion of the electrical wiring device of FIG. 2.

FIGS. 2 and 3 illustrate the internal components of the wiring device 10, including the GFCI mechanism. The wiring device 10 includes first and second face conductors 50a, 50b, each of which includes a plurality of flanges 54 for receiving and clamping onto a blade (not shown) of a plug inserted into one of the outlets 26 (FIG. 1) and connected to an external load. The device 10 further includes a phase line conductor 62a, a neutral line conductor 62b, a phase load conductor 66a, and a neutral load conductor 66b. The phase line conductor 62a is connected to a phase line input from an external power supply (not shown), and the neutral line conductor 62b is connected to a neutral (zero phase) input from the external power supply. The phase load conductor 66a is connected to a downstream load and conveys the phase line input from the phase line conductor 62a when the circuit is closed. The neutral load conductor 66b is connected to the downstream load and conveys the neutral line input from the neutral line conductor 62b when the circuit is closed.

In addition, the device 10 includes a coil sensor 70 positioned between the phase line conductor 62a and the neutral line conductor 62b, a solenoid 74, and a latch assembly 78. The coil sensor 70 senses or measures a difference between the current entering the device 10 through the phase line conductor 62a and the current exiting the device 10 through the neutral line conductor 62b. The coil sensor 70 is in communication with a controller or integrated circuit on a circuit board 134, which compares the measured difference to a predetermined value. If the measured difference exceeds the predetermined value, the integrated circuit actuates the solenoid 74 to trip the latch assembly 78 and interrupt the circuit. The operation of the solenoid 74 and latch assembly 78 is explained in further detail below.

Figure 4:
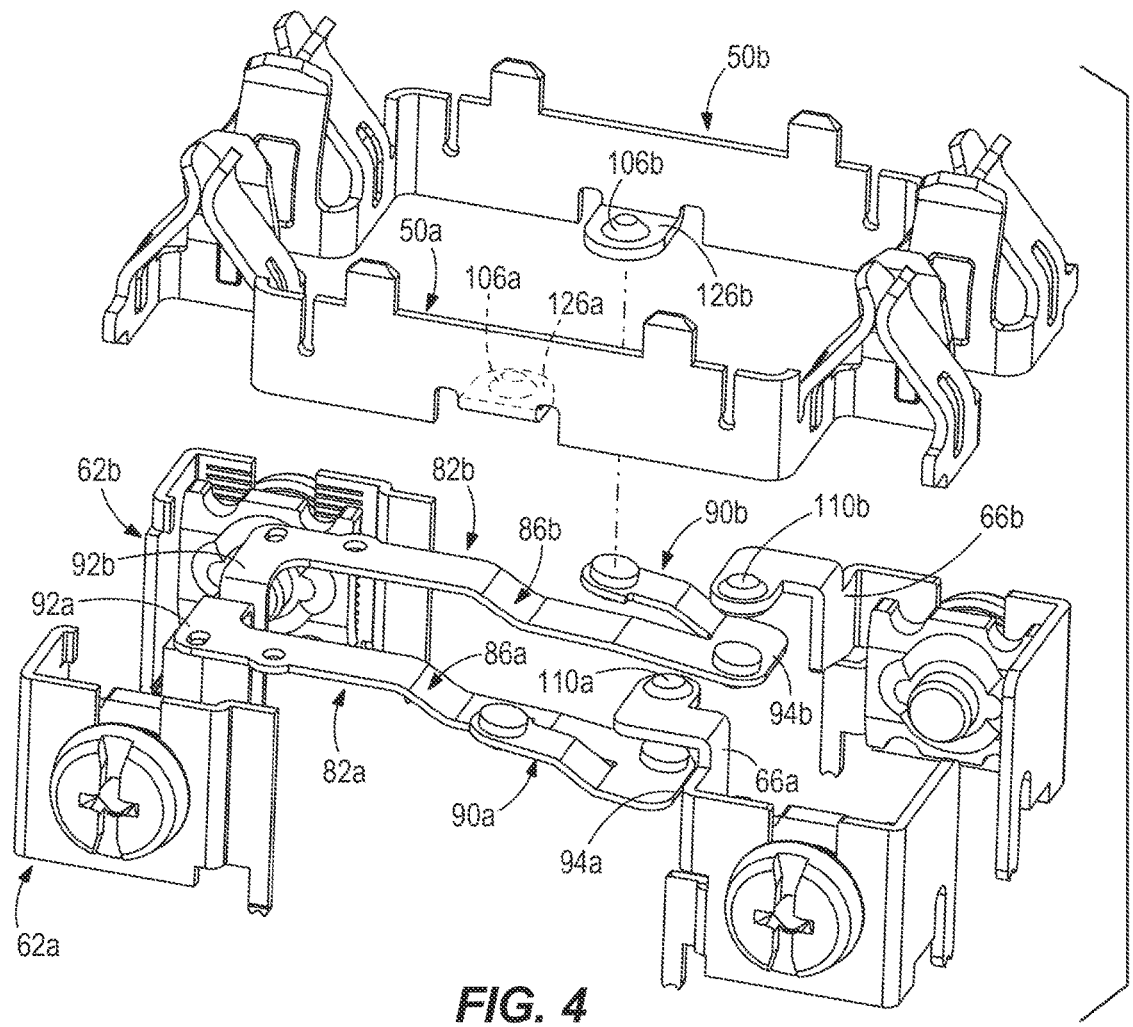
FIG. 4 is an exploded view of a portion of the electrical wiring device of FIG. 3.
Figure 5:
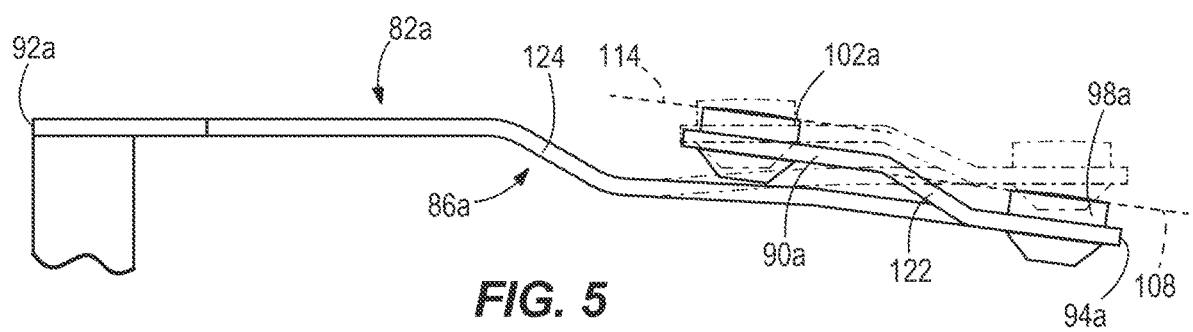
FIG. 5 is a side view of a brush conductor.

Referring now to FIG. 4, each of the phase line conductor 62a and the neutral line conductor 62b are electrically connected to a brush conductor 82a, 82b, respectively. Each brush conductor 82a, 82b includes a first portion 86 and a second portion 90, generally arranged as a continuous member generally having a J-shaped or U-shaped profile. The first portion 86 has a first end 92 electrically connected to the phase line conductor 62a (or the neutral line conductor 62b for the brush conductor 82b). In the illustrated embodiment, the first ends 92 include legs extending downwardly into the coil sensor 70 (FIG. 3). The brush conductor 82a also defines a second end 94. In the illustrated embodiment, the second end 94 is positioned adjacent a transition between the first portion 86 and the second portion 90. As shown in FIG. 5, the brush conductor 82a includes a first terminal 98a supported on the first portion 86a proximate the second end 94b, and a second terminal 102a supported on the second portion 90a at a positioned that is laterally offset from the first portion 86a and positioned between the first end 92a and the second end 94a.

As shown in FIG. 5, the first terminal 98a is positioned in a first plane 108 and the second terminal 102 is positioned on a second plane 114. The second plane 114 is generally parallel to the first plane 108, but is perpendicularly offset from the first plane 108 due to the offset positions of the first portion 86a and the second portion 90a of the brush conductor 82a. Stated another way, the first terminal 98a and the second terminal 102a are positioned on separate planes. In the illustrated embodiment, the brush conductor 82a further includes a bridge 122 extending between the first terminal 98a and the second terminal 102a, and the bridge 122 is formed by a bend in the brush conductor 82a. The bend provides additional stiffness to the second portion 90a. An additional bend or bridge 124 may be formed in the first portion 86a, between the first end 92a and the second end 94a. It will be understood by a person of ordinary skill (particularly upon inspection of the associated drawings) that the brush conductor 82b includes similar features to brush conductor 82a.

Referring again to FIG. 4, the first face conductor 50a includes a flange 126a extending transversely from the main body of the face conductor 50a and supporting a first face terminal 106a. The phase load conductor 66a includes a flange supporting a phase load terminal 110a. It is understood that the second face conductor 50b and the neutral load conductor 66b each have similar terminals.

Figure 6:
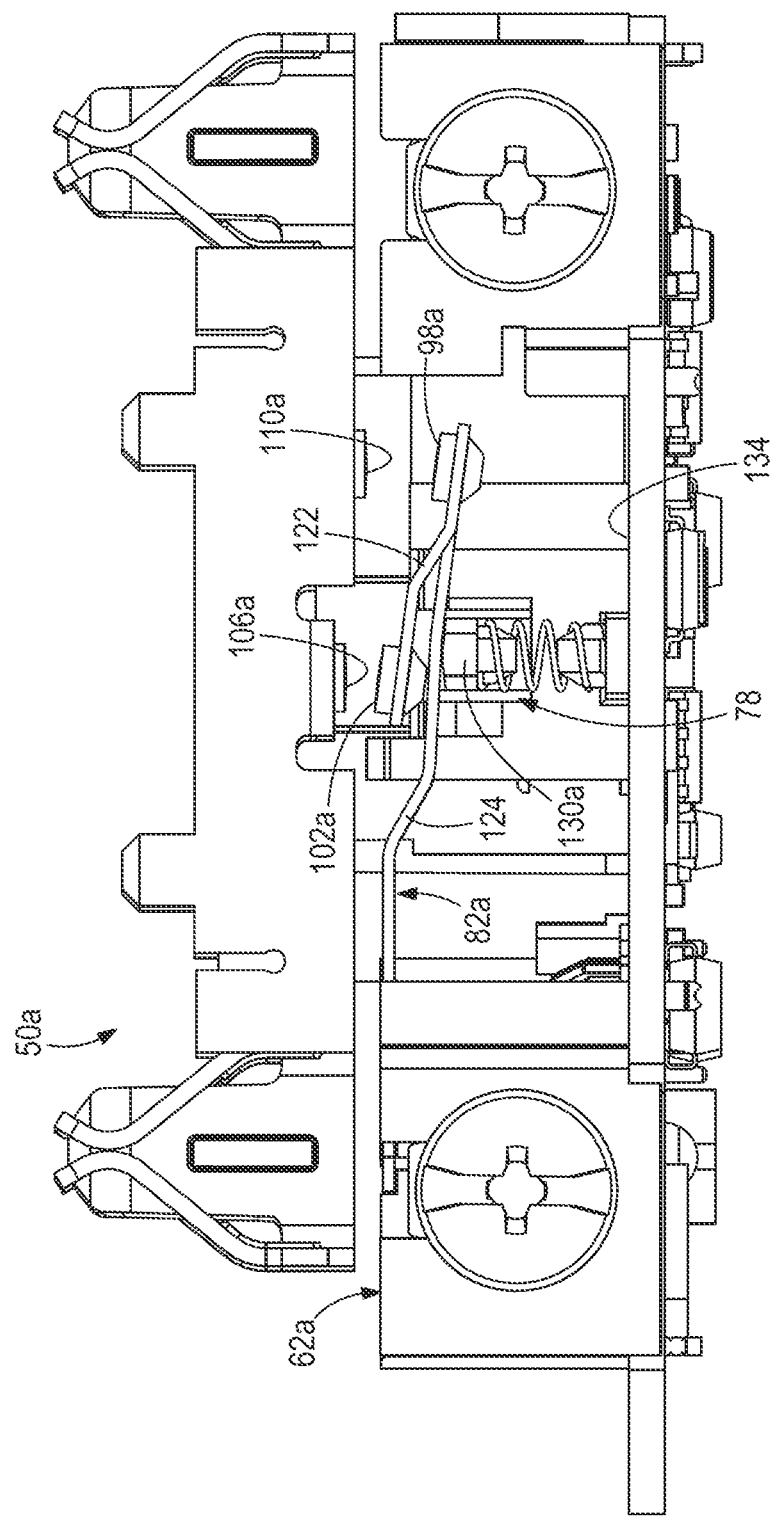
FIG. 6 is a side view of the assembled portion of the electrical wiring device of FIG. 3 with a brush conductor in an open position.

FIG. 6 illustrates the circuit of the wiring device in an open state (i.e., when the interrupter mechanism has been tripped). The first terminal 98a is spaced apart from the phase load terminal 110a, and the second terminal 102a is spaced apart from the first face terminal 106a. As discussed in further detail, the latch assembly 78 is biased toward an open position, such that a housing arm 130a is not contacting the brush conductor 82a.

Figure 7:
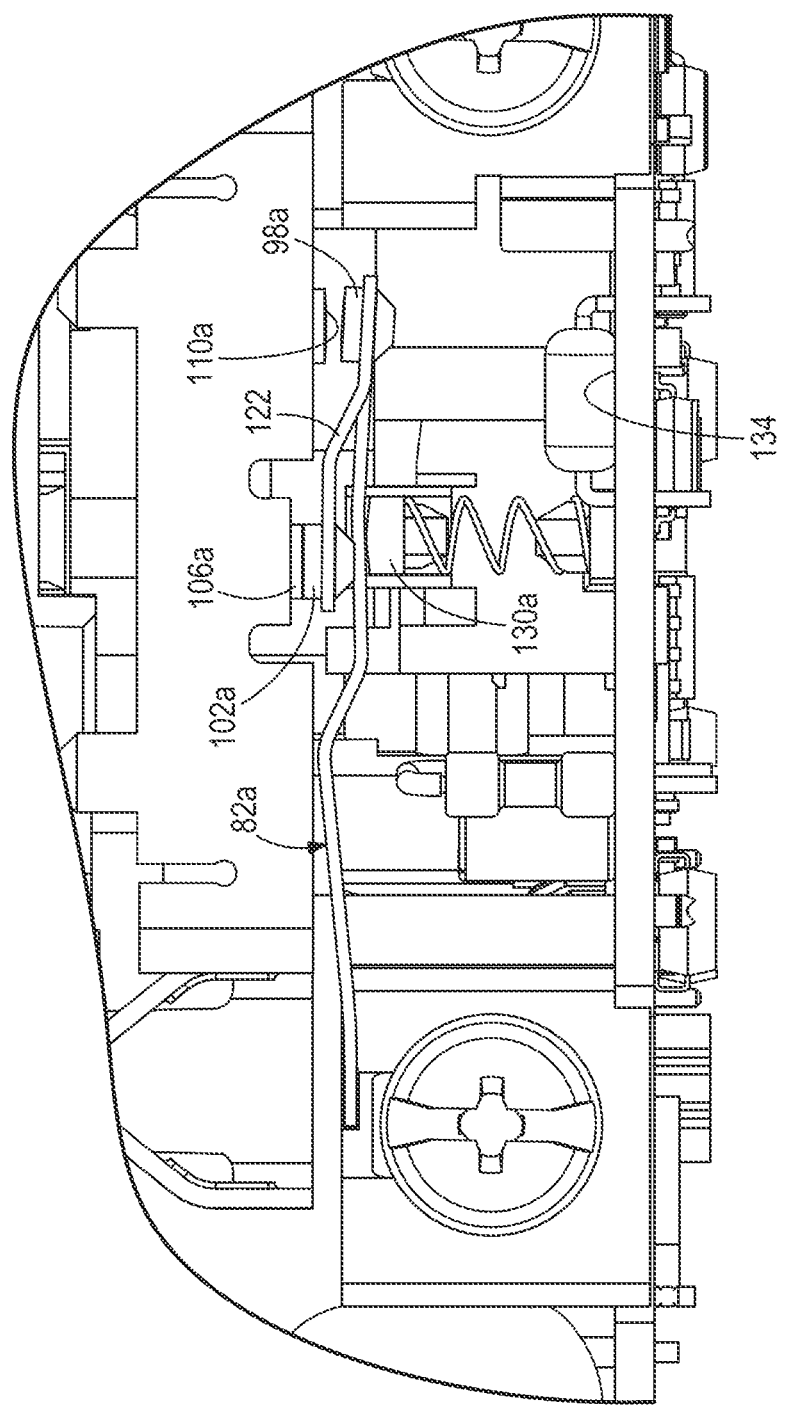
FIG. 7 is a side view of the assembled portion of the electrical wiring device of FIG. 3 with the brush conductor in a partially closed position.
Figure 8:
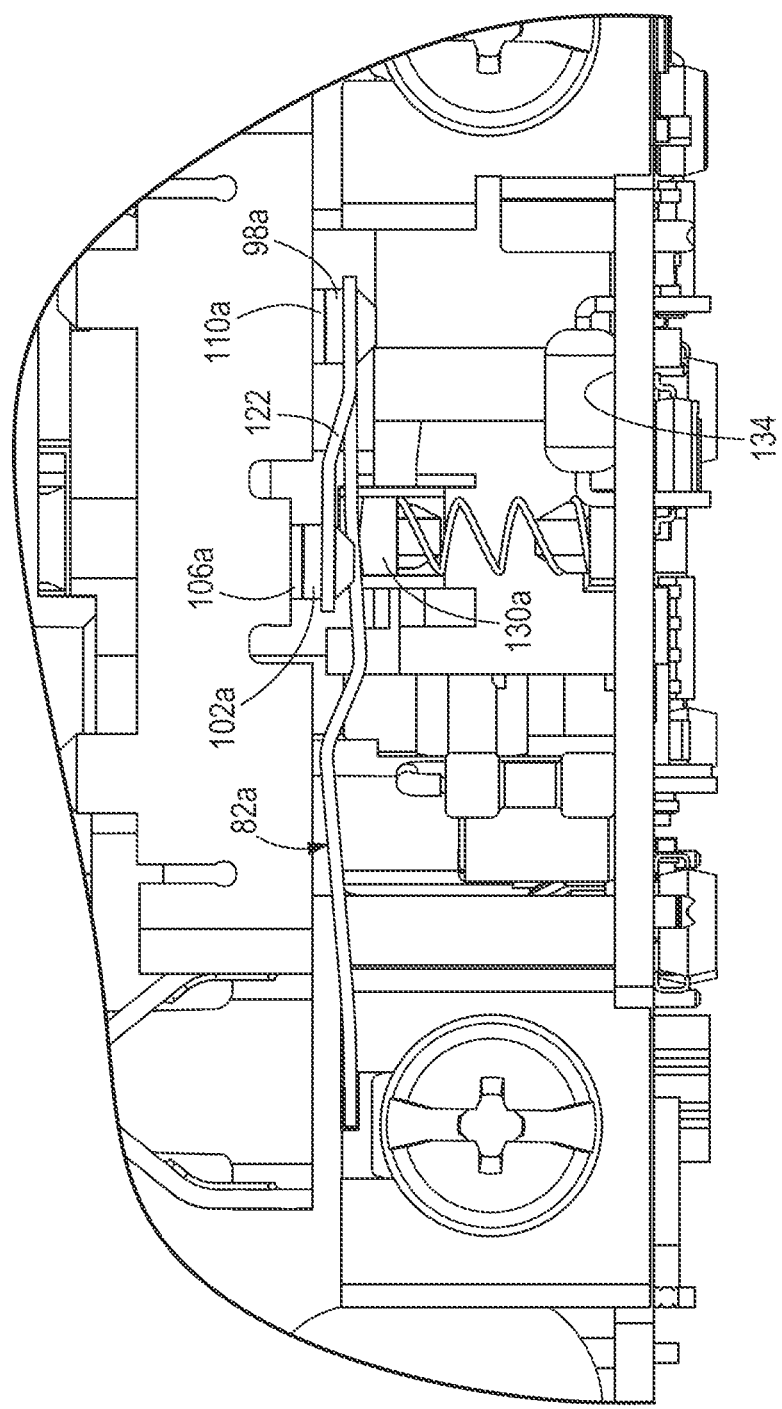
FIG. 8 is a side view of the assembled portion of the electrical wiring device of FIG. 3 with the brush conductor in a closed position.

FIGS. 7 and 8 illustrate the arm 130a moving away from a printed circuit board 134 such that the arm 130a contacts and moves the brush conductor 82a upwardly. As shown in FIG. 7, the second terminal 102a engages the first face terminal 106a before the first terminal 98a engages the phase load terminal 110a. As the arm 130a continues to move away from the circuit board 134, the arm 130a urges the first terminal 98a into contact with the phase load terminal 110a (FIG. 8). The first terminal 98a and the second terminal 102a close the circuit at two separate load source locations, and the bended bridge 122 creates an additional bending moment on the brush conductor 82a to provide independent contact forces at each terminal 98a, 102a. The design allows for independent preload forces, permitting larger preload and breakaway forces.

Figure 9:
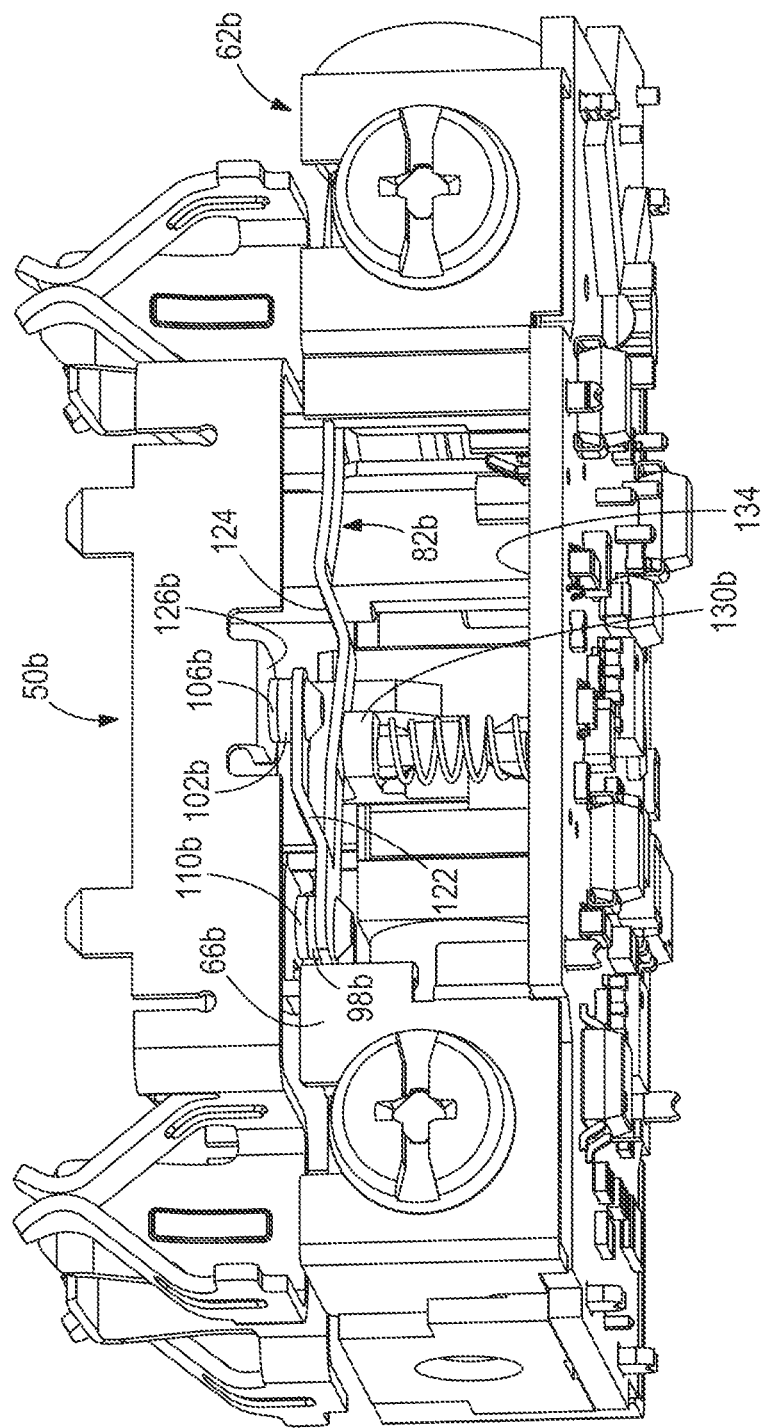
FIG. 9 is a lower perspective view of the portion of the electrical wiring device shown in FIG. 8.

Although the above description referred primarily to the brush conductor 82a coupled to the phase line conductor 62a, it is understood that the brush conductor 82b coupled to the neutral line conductor 62b is structured in a similar manner and operates in a similar manner (see FIG. 9).

Figure 10:
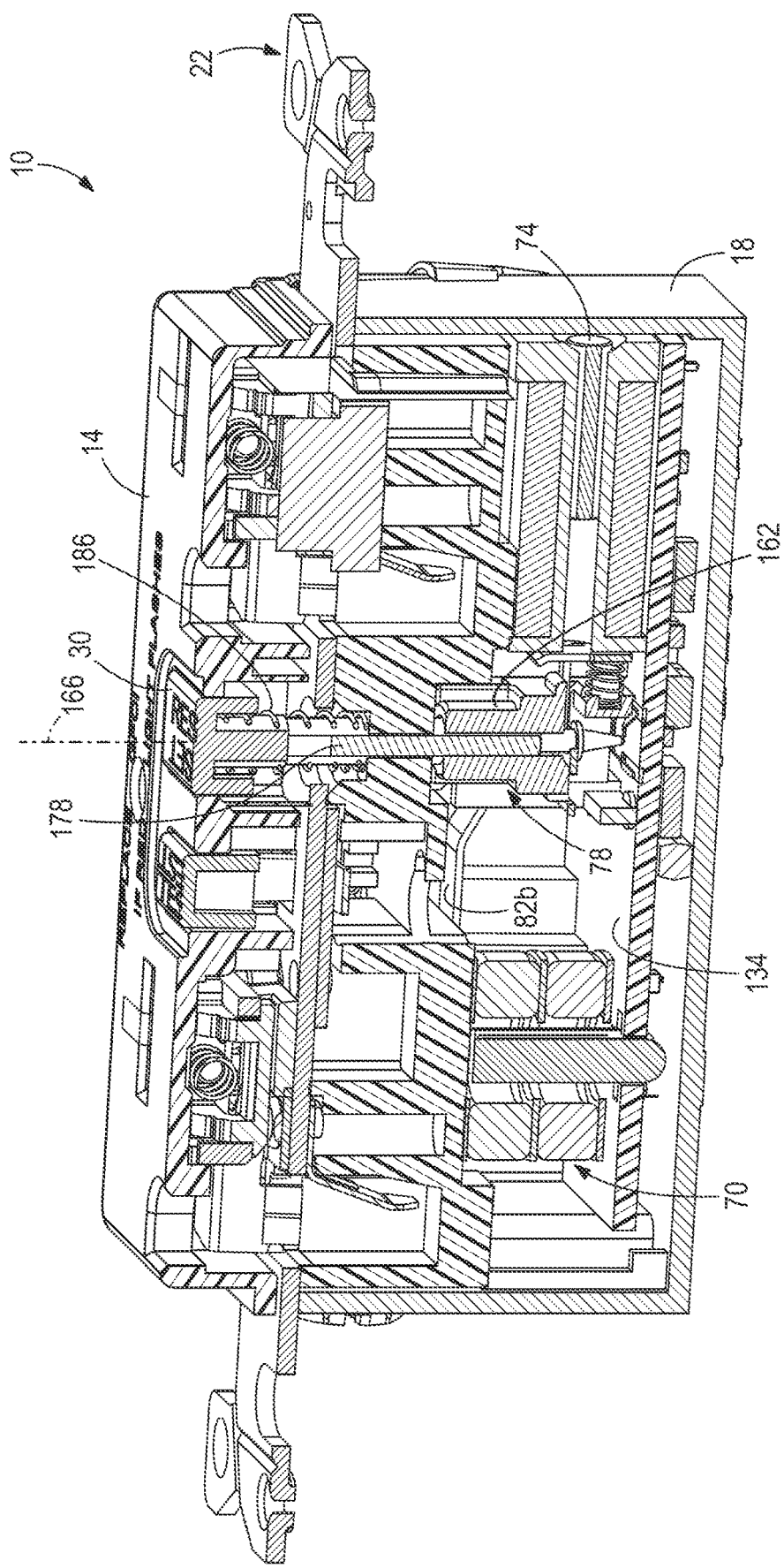
FIG. 10 is a section view of the electrical wiring device of FIG. 1 viewed along section 10-10.
Figure 11:
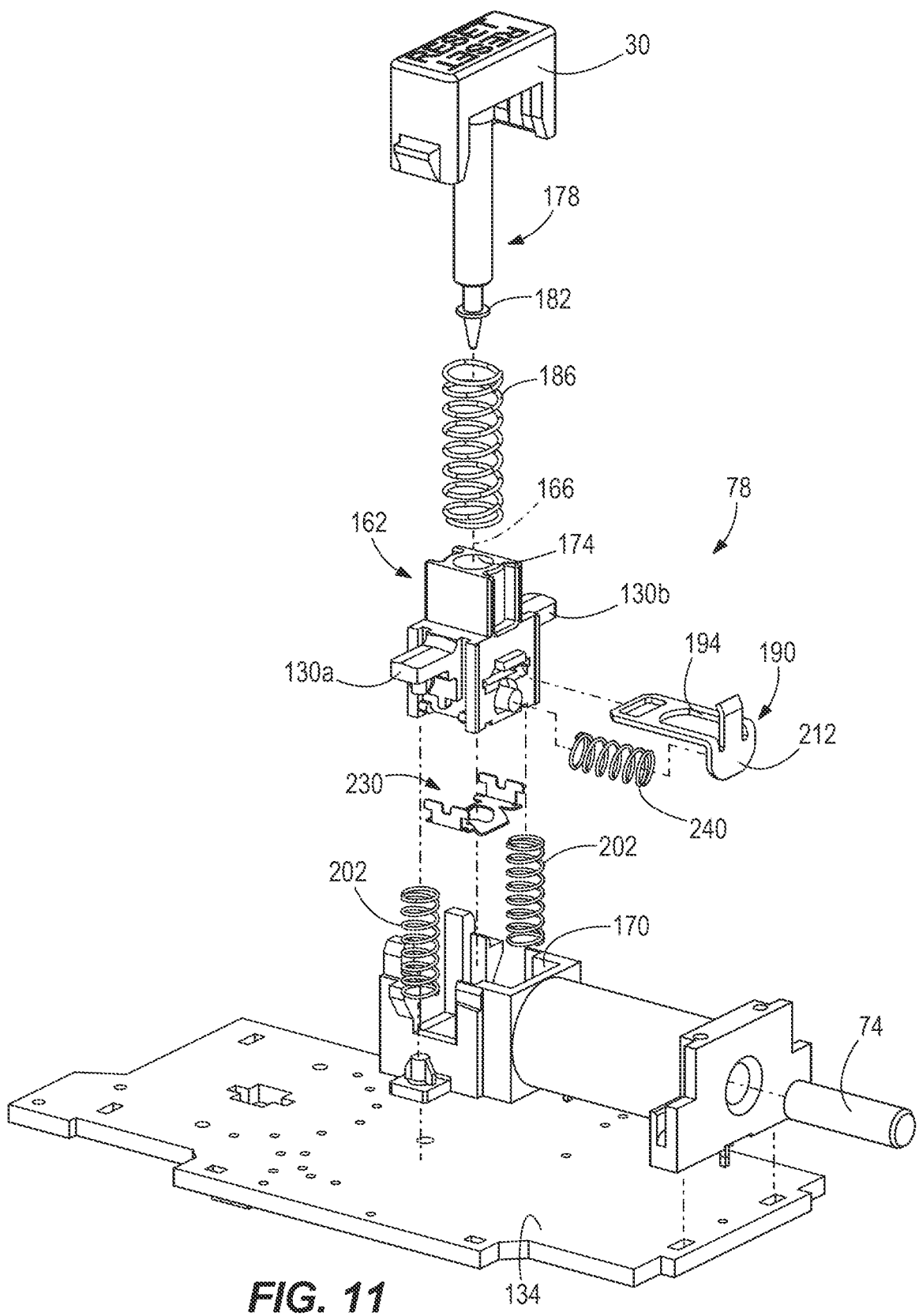
FIG. 11 is an exploded view of a ground fault circuit interrupter (GFCI) device for the electrical wiring device of FIG. 1.

FIGS. 10 and 11 illustrate the latch assembly 78 that biases the brush conductors 82a, 82b. Referring to FIG. 11, the latch assembly 78 includes a housing 162 that is movable along an axis 166 within a guide member 170. In the illustrated embodiment, the guide member 170 is couple to the circuit board 134. The housing 162 includes a bore 174 extending along the axis 166. The bore 174 receives a portion of a reset shaft 178 that is coupled to the reset button 30. A flange 182 is positioned proximate an end of the reset shaft 178. A spring 186 is positioned between a portion of the wiring device and the reset button 30 to apply a biasing force between the reset button 30 and the housing 162.

Figure 12:
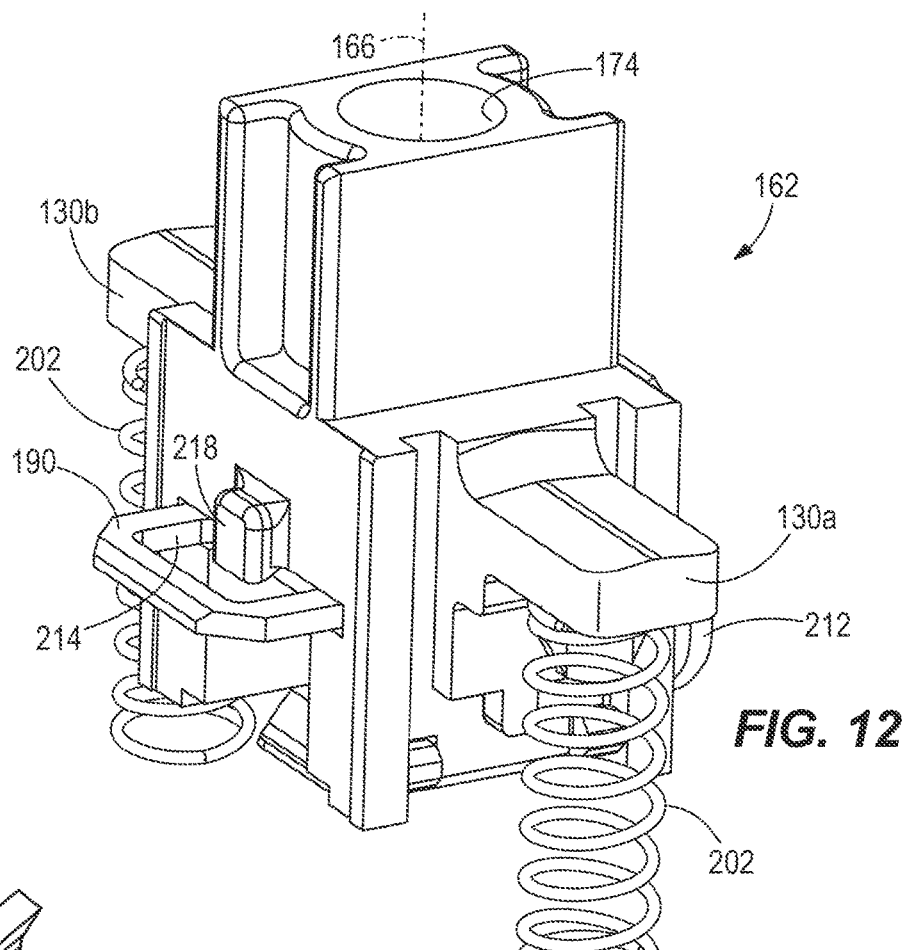
FIG. 12 is a perspective view of a latch assembly.
Figure 13:
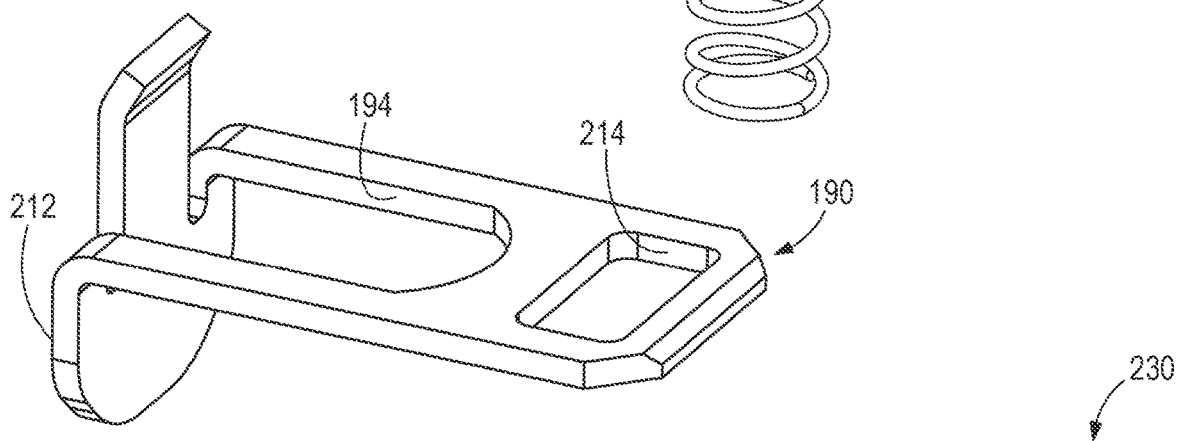
FIG. 13 is a perspective view of a latch plate.

As shown in FIGS. 12 and 13, the housing 162 further includes a latch plate 190 extending at least partially through the housing 162. The latch plate 190 is supported for movement relative to the housing 162 in a direction transverse to the axis 166. The latch plate 190 includes a hole 194 (FIG. 13) extending parallel to the axis 166. The housing 162 is biased away from the circuit board 134 (FIG. 11) by springs 202 (FIG. 13). The housing 162 also includes arms 130a, 130b (FIG. 12) extending outwardly from each side of the housing 162. As the housing 162 is biased away from the circuit board 134, the arms 130a, 130b contact the brush conductors 82a, 82b (FIGS. 8 and 9) and move them into contact with the face conductors 50a, 50b, respectively, and the load conductors 66a, 66b, respectively.

In the illustrated embodiment, the latch plate 190 includes a flange 212 positioned on one end and a slot 214 positioned proximate an opposite end. The housing 162 includes a tab 218 (FIG. 12) extending into the slot 214. In the illustrated embodiment, the tab 218 is integrally molded with the housing 162. During installation, the latch plate 190 is inserted into the housing 162 until the tab 218 is inserted into the slot 214, thereby capturing or retaining the latch plate 190 and limiting the range of travel of the latch plate 190 relative to the housing 162. This prevents the latch plate 190 from over-travelling or moving too far to either side of the axis 166. The latch plate 190 is also biased (e.g., by a spring 240 positioned between the housing 162 and the flange—see FIG. 11) toward a first position such that the hole 194 is not aligned with the bore 174 along the axis 166.

Figure 14:
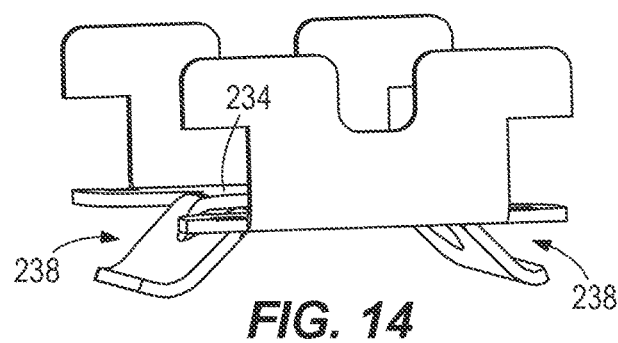
FIG. 14 is a perspective view of a switch member.
Figure 14A:
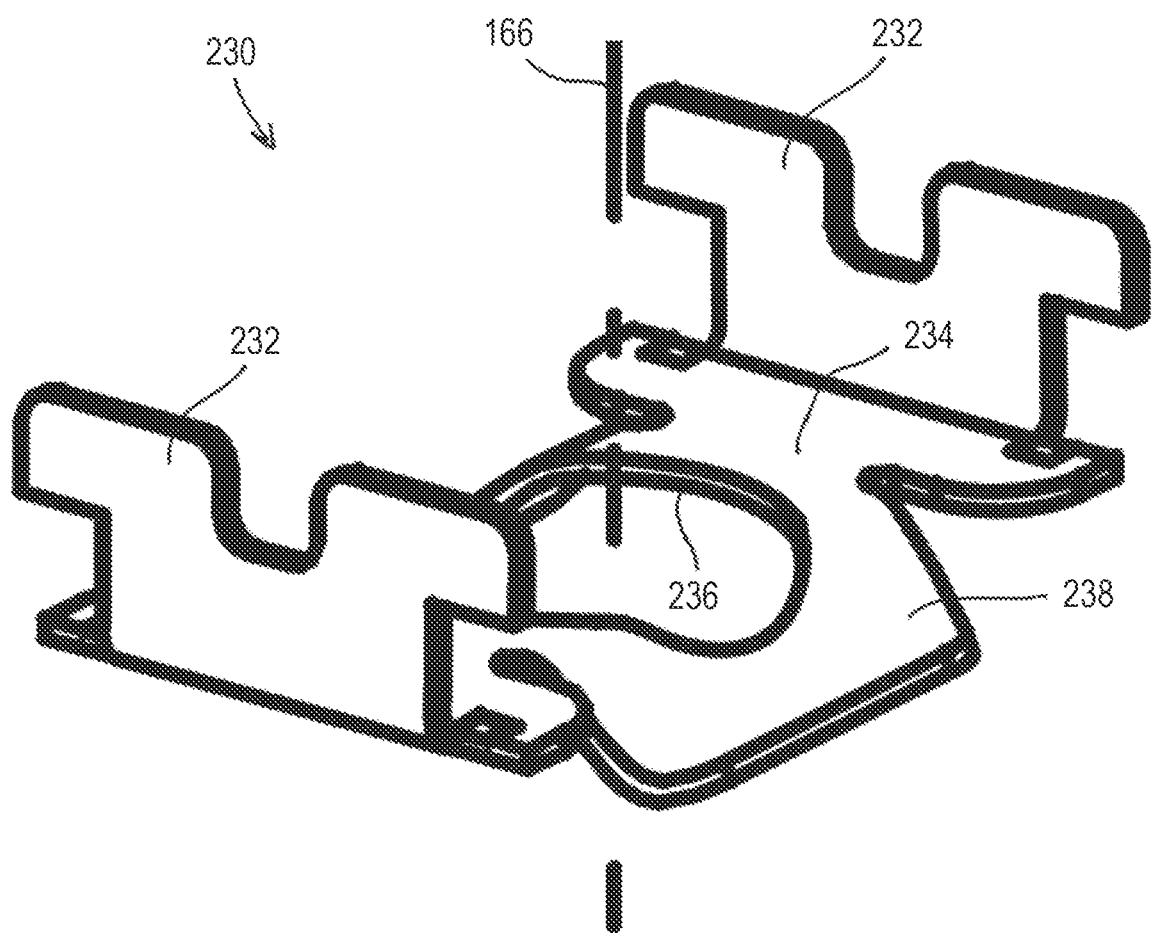
FIG. 14A is a perspective view of the switch member of FIG. 14.

Referring to FIG. 14, a switch member 230 is positioned on an end of the housing 162 opposite the end of the housing 162 that receives the reset shaft 178 (e.g., the switch member 230 is positioned on a lower end). The switch member 230 is positioned proximate the circuit board 134 (FIG. 11). The switch member 230 includes a central portion 234 coupled to the end of the housing 162 and a pair of flanges 238 extending outwardly from the central portion 234. Each of the flanges 238 extends away from the central portion 234 at an angle. The flanges 238 are resiliently coupled to the central portion 234. Stated another way, each flange 238 can deflect relative to the central portion 234, providing a spring-like response behavior when a force is applied against an end of the flange 238. The switch member 230 forms a butterfly contact made of conductive material. In the illustrated embodiment, the switch member 230 includes a pair of tabs 232 extending upwardly from the central portion 234 and coupled to the housing 162. The central portion 234 may include an opening 236 (FIG. 14A) aligned with the axis 166 and permitting an end of the reset shaft to 174 to pass through.

Figure 15:
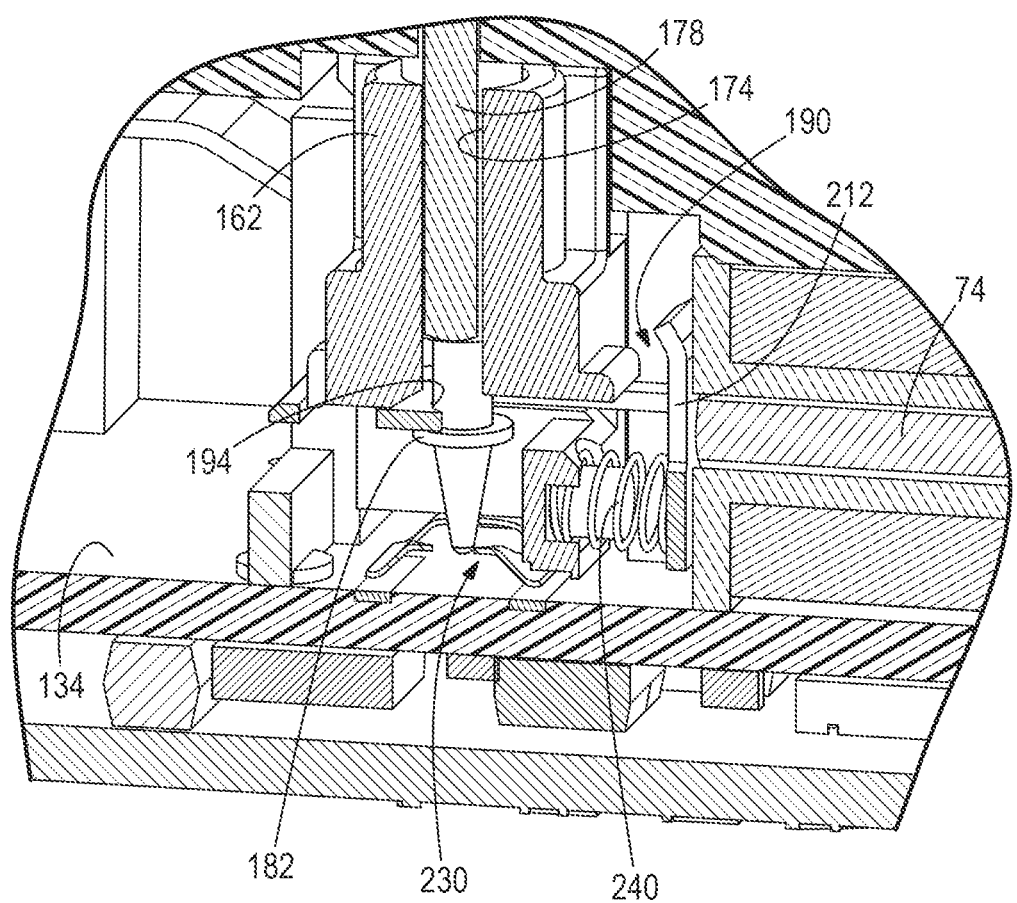
FIG. 15 is a section view of a GFCI device with a reset shaft in a first position and a latch plate in a first position.

FIG. 15 illustrates the GFCI device during standard operation of the receptacle when the circuit is closed. The reset shaft 178 extends through the bore 174 of the housing 162 and through the hole 194 such that the flange 182 engages an underside of the latch plate 190, securing the reset shaft 178 relative to the housing 162. With the reset shaft 178 and the housing 162 secured together, the housing 162 is spaced apart from the circuit board 134, and the arms 130a, 130b (FIG. 12) bias the brush conductors 82a, 82b (FIG. 3) into engagement with the face conductors 50 and load conductors 66.

Figure 16:
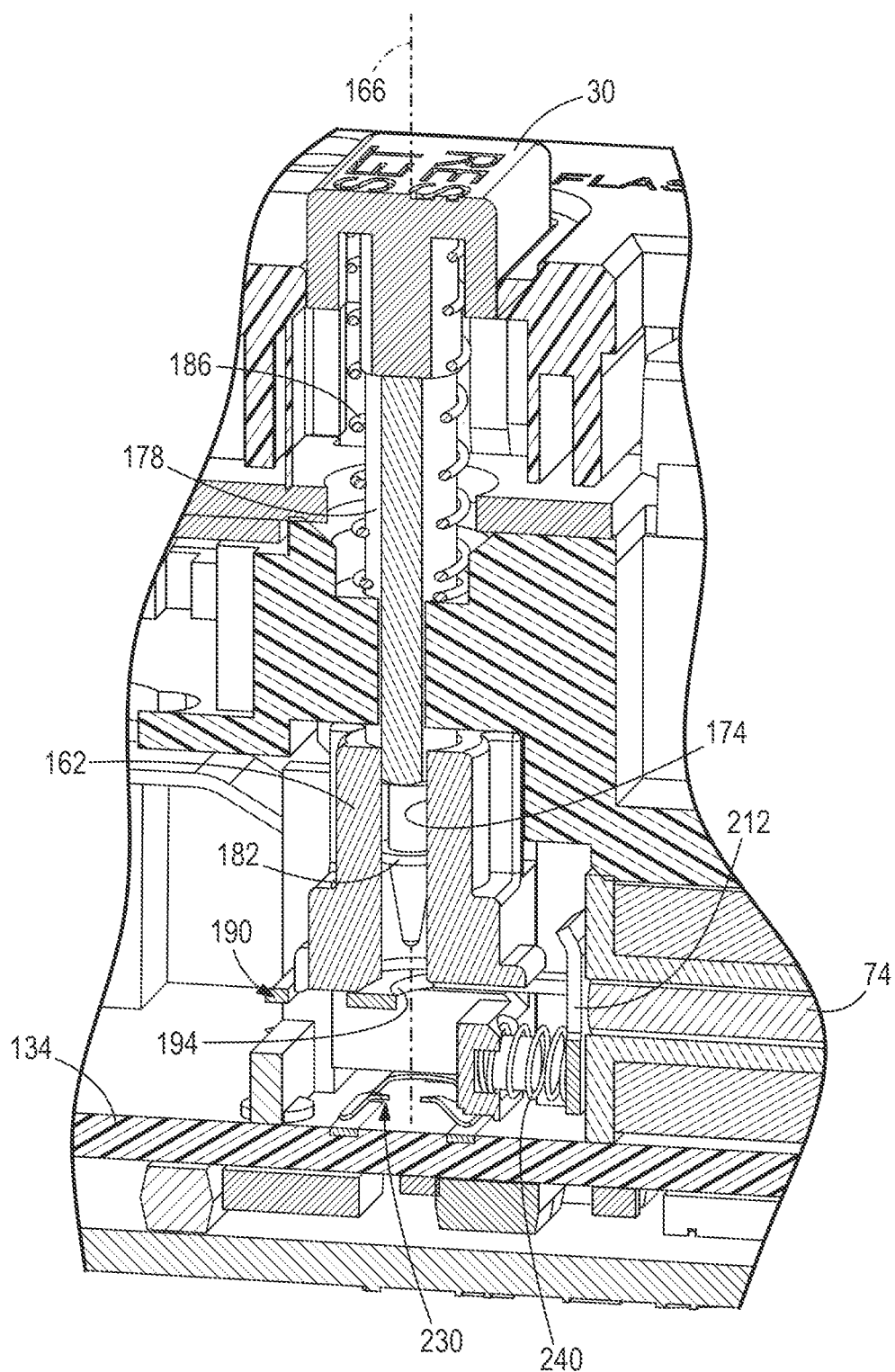
FIG. 16 is a section view of the GFCI device of FIG. 15 with the reset shaft in a second position.

When the coil sensor 70 actuates the solenoid 74 (e.g., when a ground fault is detected), the solenoid 74 moves the latch plate 190 transversely through the housing 162 (e.g., to the left in FIG. 15, against the bias of spring 240) so that the hole 194 of the latch plate 190 is aligned with the bore 174 of the housing 162. As shown in FIG. 16, the flange 182 of the reset shaft 178 is biased upwardly away from the housing 162 due to the spring 186, and the reset button 30 rises above the face plate 14. The housing 162 is no longer biased upwardly, and the arms 130 do not contact the brush conductors 82a, 82b (see FIG. 6). As a result, the brush conductors 82a, 82b move away from the face conductors 50a, 50b and the load conductors 66a, 66b opening the circuit and preventing further flow of electric current.

Figure 17:
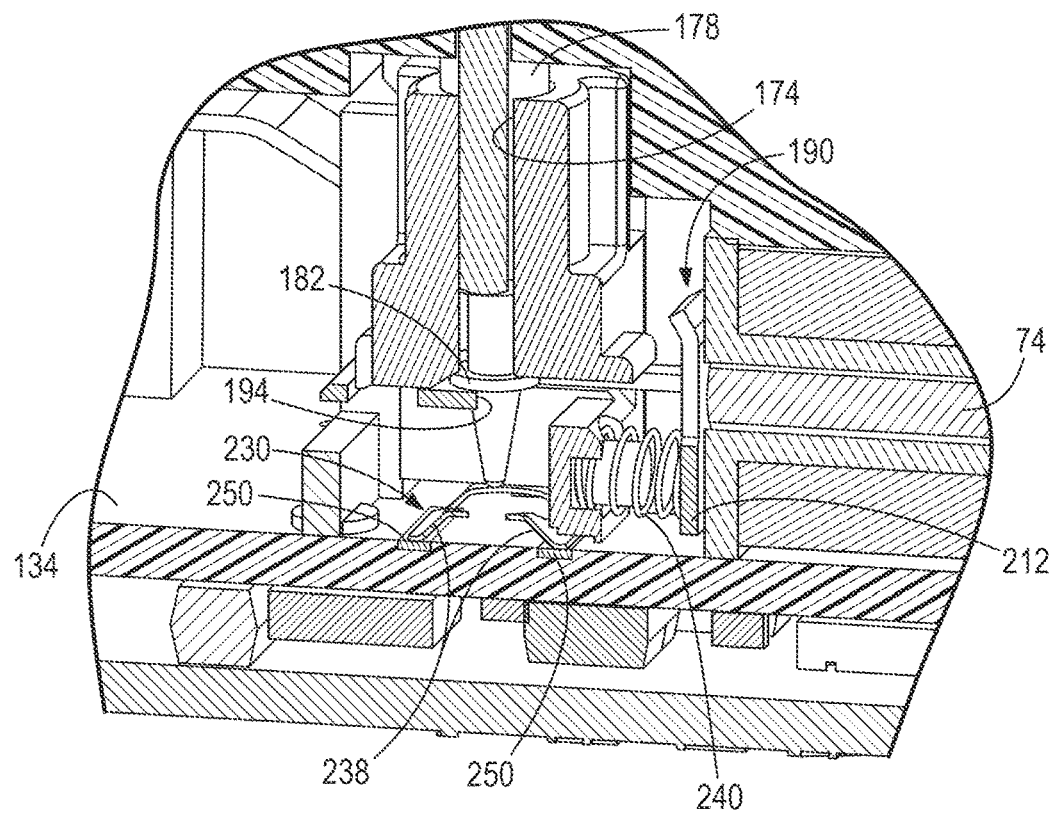
FIG. 17 is a section view of the GFCI device of FIG. 15 with the reset shaft in a third position.
Figure 18:
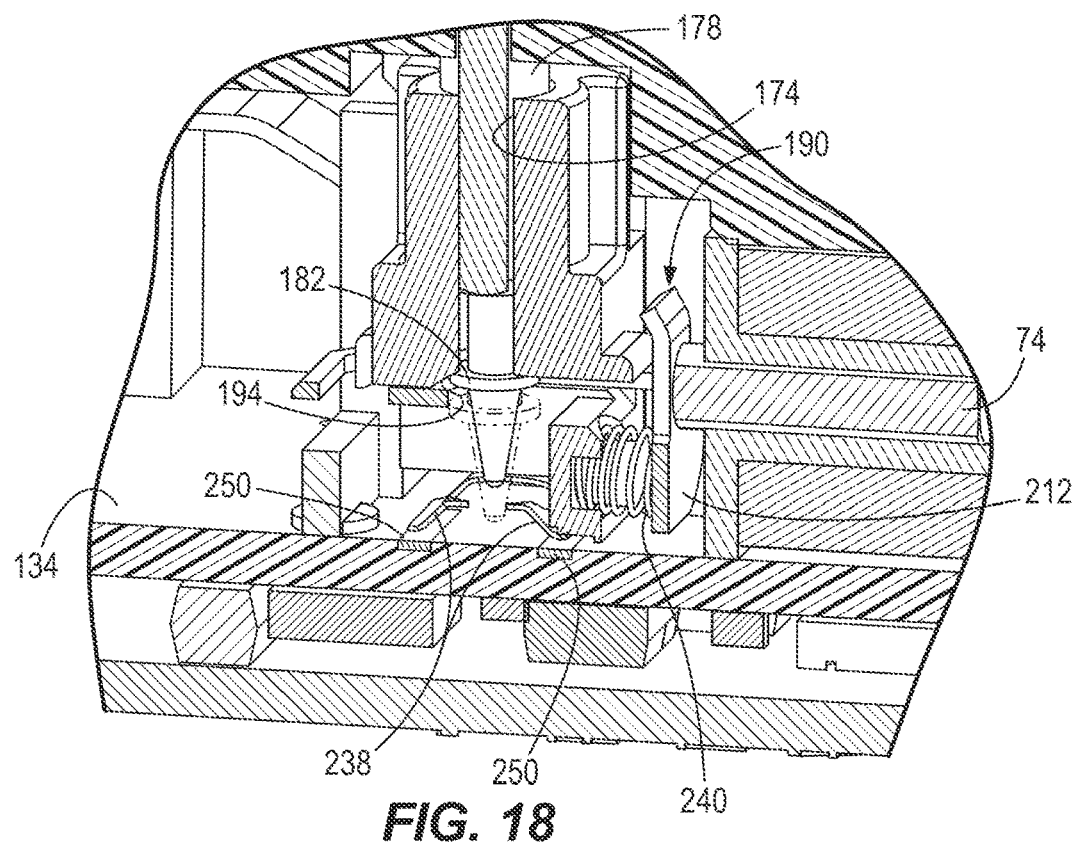
FIG. 18 is a section view of the GFCI device of FIG. 15 with the reset shaft in a fourth position and the latch plate in a second position.

When the reset button 30 is pushed by a user, the shaft 178 is moved toward the circuit board 134. As shown in FIG. 17, the flange 182 engages the latch plate 190 and moves the housing 162 and the switch member 230 toward the circuit board 134. The ends of the flanges 238 on the switch member 230 are positioned to contact predetermined areas 250 of the circuit board 134 when the housing 162 is moved toward the circuit board 134. The flange ends contact the circuit board 134, and the switch member 230 completes a circuit between the predetermined areas. In one embodiment, the completion of the circuit by the switch member 230 actuates the test circuit, which again actuates the solenoid 74. As shown in FIG. 18, the solenoid 74 moves the hole 194 of the latch plate 190 into alignment with the bore 174, allowing the flange 182 of the reset shaft 178 to move below the latch plate 190. When the solenoid 74 is deactivated, the hole 194 of the latch plate 190 moves out of alignment with the bore 174, capturing the flange 182 below the latch plate 190 (FIG. 15).

Figure 19:
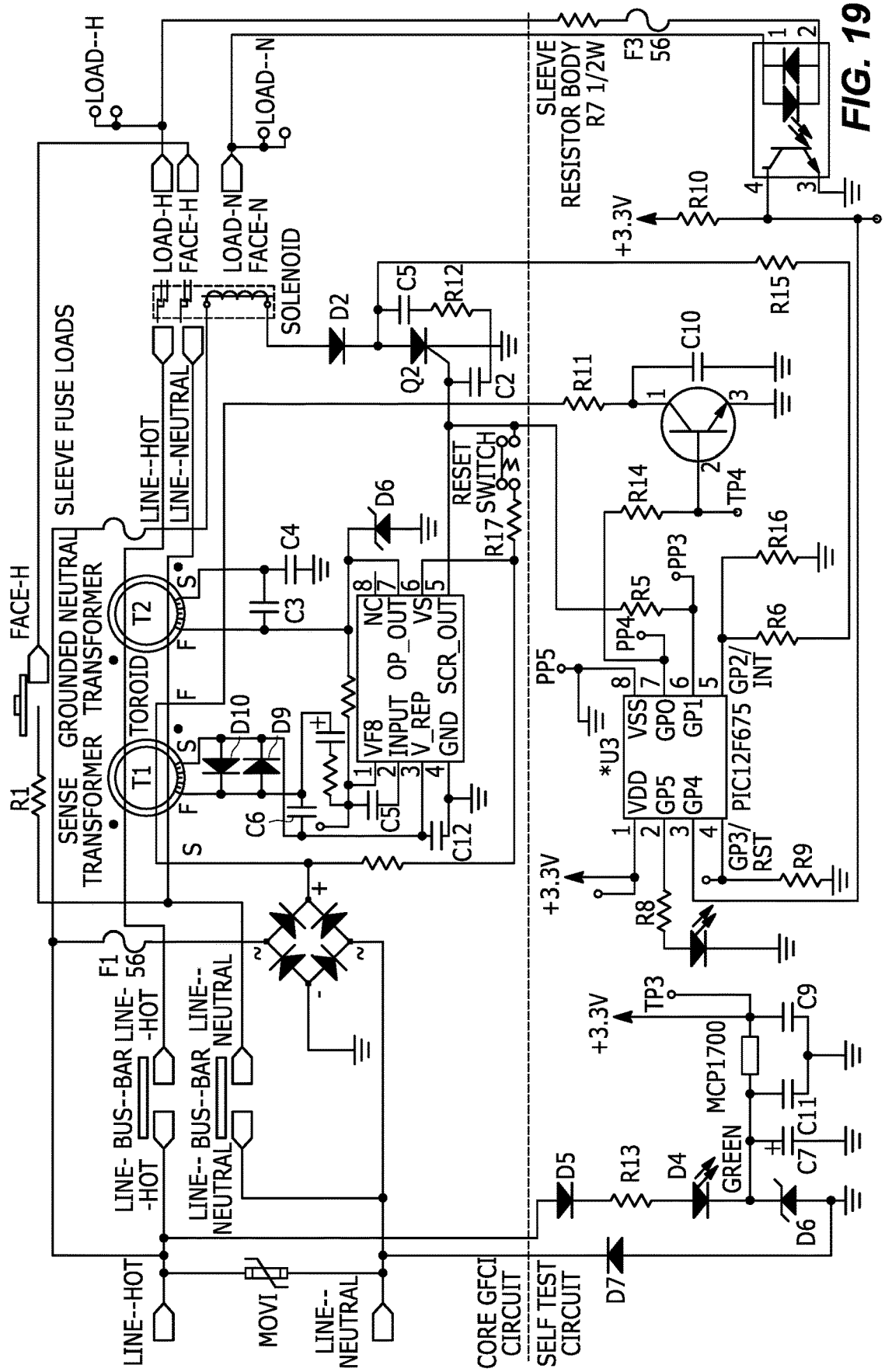
FIG. 19 is a schematic view of a circuit for a GFCI device.
Figure 20:
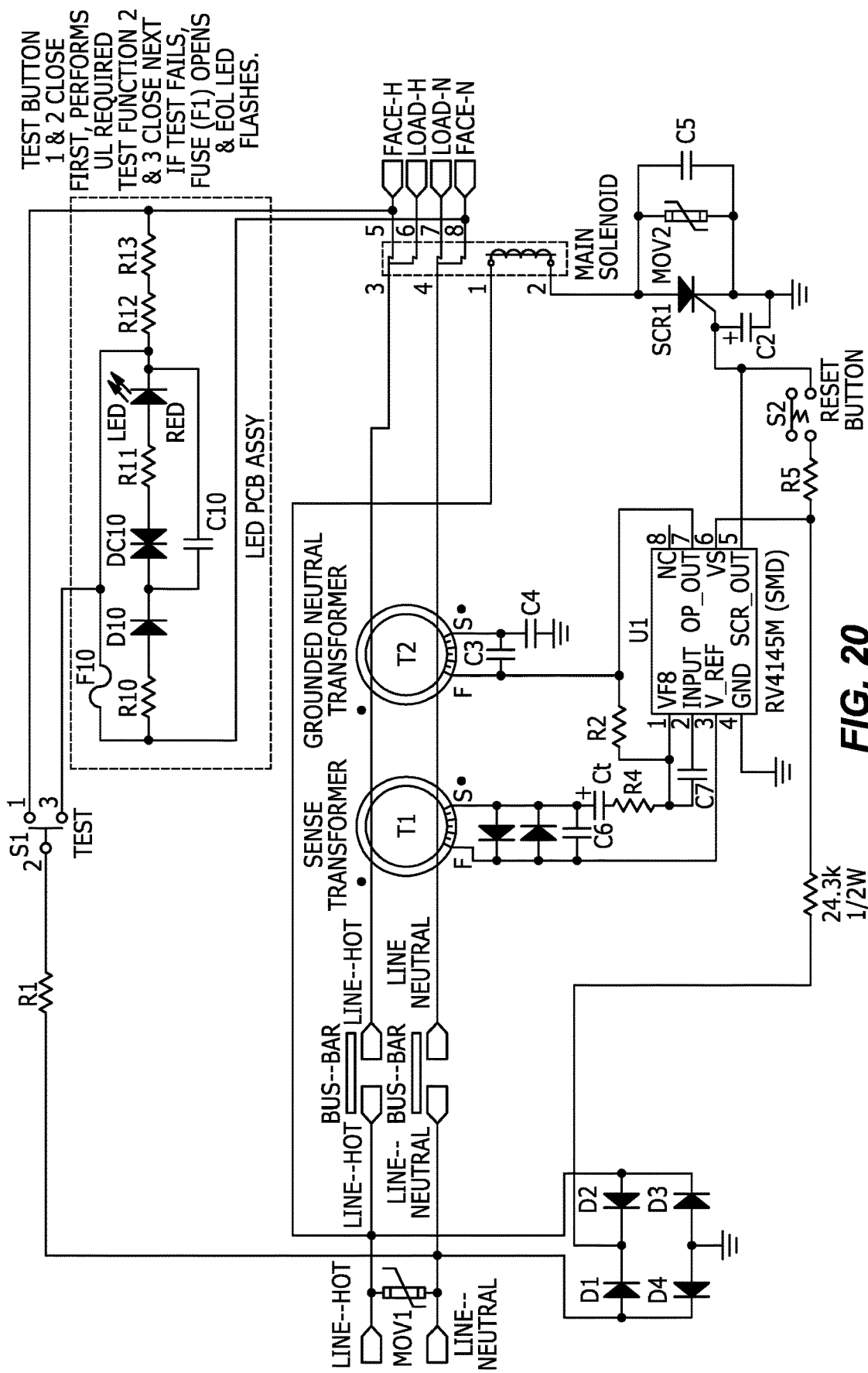
FIG. 20 is a schematic view of a circuit for a GFCI device according to another embodiment.

FIG. 19 illustrates a schematic of the circuit incorporating the GFCI mechanism described above. Similarly, FIG. 20 illustrates a schematic of the circuit according to another embodiment.

Although certain embodiments have been described in detail, variations and modifications exist within the scope and spirit of one or more independent aspects as described.

The invention claimed is:

1. A circuit interrupting device comprising:
an input conductor for electrically connecting to an external power supply;
a load conductor for electrically connecting to a load, the load conductor including a load terminal;
a face conductor for electrically connecting to an external load, the face conductor including a face terminal; and
a brush conductor in electrical communication with the input conductor and movable between a closed position and an open position, the brush conductor including a first terminal and a second terminal, the first terminal configured to contact the load terminal and the second terminal configured to contact the face terminal, the brush conductor including a bridge connected between the first terminal and the second terminal, movement of the brush conductor to the closed position causing deflection of the bridge, deflection of the bridge creating a moment to provide independent forces on each of the first terminal and the second terminal.

2. The circuit interrupting device of claim 1, wherein, while the brush conductor is in the closed position, the first terminal contacts the load terminal and the second terminal contacts the face terminal to provide electrical communication between the input conductor, the load conductor, and the face conductor,
wherein, while the brush conductor is in the open position, the first terminal is spaced apart from the load terminal and the second terminal is spaced apart from the face terminal to inhibit electrical communication between the input conductor, the load conductor, and the face conductor.

3. The circuit interrupting device of claim 1, wherein the first terminal of the brush conductor extends in a first plane and the second terminal of the brush conductor extends in a second plane parallel to and offset from the first plane, the bridge portion forming an angle relative to the first plane.

4. The circuit interrupting device of claim 1, wherein a pivoting movement of the brush conductor causes the second terminal to contact the face terminal before the first terminal contacts the load terminal.

5. The circuit interrupting device of claim 1, wherein the first terminal is supported on a first portion of the brush conductor and the second terminal is supported on a second portion of the brush conductor,
wherein as the brush conductor moves toward the closed position, the first portion pivots about the first end and drives the second terminal into contact with the face terminal, and
wherein continued movement of the brush conductor toward the closed position causes the second portion to deflect about the second end of the brush conductor, the continued movement drives the first terminal into contact with the load terminal.

6. The circuit interrupting device of claim 1, further comprising a latch assembly including a housing having an arm engaging the brush conductor, the housing movable between a first position and a second position,
wherein when the housing is in the first position, the arm biases the brush conductor toward the closed position,
wherein when the housing is in the second position, the brush conductor moves toward the open position.

7. The circuit interrupting device of claim 6, wherein the brush conductor includes a first end connected to the input conductor and a second end opposite the first end, the first terminal positioned proximate the second end, a cantilevered portion extending away from the second end such that the second terminal is positioned between the first end and the second end of the brush conductor,
wherein when the housing is in the first position the housing arm pivots the brush conductor about the first end.

8. The circuit interrupting device of claim 6, further comprising a circuit board positioned proximate an end of the housing, wherein the latch assembly further includes a contact member coupled to the end of the housing and selectively engaging the circuit board to complete a circuit.

9. The circuit interrupting device of claim 8, wherein the contact member includes a central portion coupled to the end of the housing and a pair of flanges, the flanges extending away from the flat portion at an angle to provide a resiliency in the flanges relative to the central portion, each flange including an end for contacting a predetermined area on the circuit board.

10. The circuit interrupting device of claim 8, further comprising a solenoid movable in a first direction, wherein the latch housing further includes a latch plate supported in the housing and movable relative to the housing in the first direction, wherein actuation of the solenoid moves the latch plate in the first direction, thereby allowing the housing to move to the second position.

11. The circuit interrupting device of claim 1, wherein the input conductor is a neutral line conductor.

12. The circuit interrupting device of claim 1, wherein the input conductor is a phase line conductor.

13. A circuit interrupting device comprising:
   a circuit board;
   a line conductor for electrically connecting to an external power supply;
   a load conductor for electrically connecting to an external load, the load conductor including a load terminal;
   a face conductor for electrically connecting to another external load, the face conductor including a face terminal;
   a brush conductor in electrical communication with the line conductor and movable between a closed position and an open position, the brush conductor including a first terminal selectively contacting the face terminal and a second terminal selectively contacting the load terminal; and
   a latch assembly including,
      a housing movable between along an axis and biasing the brush conductor toward the closed position, and
      a switch member positioned adjacent an end of the housing, the switch including a flange resiliently connected to the main portion, the flange including an end configured to contact a circuit board in a predetermined area to complete a circuit.

14. The circuit interrupting device of claim 13, further comprising a solenoid movable in a first direction perpendicular to the axis, wherein the latch housing further includes a latch plate supported in the housing and movable relative to the housing in the first direction, wherein actuation of the solenoid moves the latch plate in the first direction, thereby releasing the housing to move along the axis.

15. The circuit interrupting device of claim 14, wherein the latch plate includes an opening, the housing including a tab extending into the opening to limit the maximum travel of the latch plate relative to the housing.

16. The circuit interrupting device of claim 14, further comprising a reset shaft movable along the axis,
   wherein the housing includes a bore extending along the axis and receiving at least a portion of the reset shaft, the latch plate including a hole extending parallel to the bore,
   wherein when the hole is offset relative to the bore, the plate engages the shaft to secure the shaft relative to the latch housing,
   wherein when the hole is aligned with the bore, the shaft is permitted to move relative to the housing and the housing is biased away from the brush conductor.

17. The circuit interrupting device of claim 13, wherein the biasing structure includes a pair of flanges resiliently connecter to a main portion of the switch member, each of the flanges extending away from the main portion at an angle and including an end configured to contact the circuit board in a predetermined area, such that simultaneous contact of each flange end with the circuit board completes a circuit.

18. The circuit interrupting device of claim 17, wherein the simultaneous contact of each flange end of the switch member closes a circuit to actuate a solenoid and move a latch plate such that a hole of the latch plate is aligned with a bore of a housing.

* * * * *